UNITED STATES PATENT OFFICE.

WILHELM STEINKOPF, OF KARLSRUHE, GERMANY.

PROCESS OF PRODUCING SULFUR DERIVATIVES OF HYDROCARBONS.

1,085,708. Specification of Letters Patent. Patented Feb. 3, 1914.

No Drawing. Application filed July 8, 1912. Serial No. 708,194.

*To all whom it may concern:*

Be it known that I, Dr. Ing. WILHELM STEINKOPF, a citizen of the German Empire, residing at Karlsruhe, Germany, have invented certain new and useful Improvements in the Process of Producing Sulfur Derivatives of Hydrocarbons, of which the following is a specification.

On conducting ethylene or coal gas over heated pyrite or acetylene through heated sulfur a formation of thiophen takes place as first shown by V. Meyer, however the quantity of thiophen so formed is quite insignificant. It was now found that a good yield of thiophen and other sulfur derivatives of hydrocarbons is obtained, if acetylene, or acetylene diluted with hydrogen, sulfureted hydrogen, and other gases, not affected by this reaction, is conducted over pyrites at about 300° centigrade.

Example: Finely powdered pyrites were heated in an iron tube, provided with an endless screw, to 300–320° for six hours; 120–140 liters of acetylene were led over per hour under a continual renewal of the pyrites (in all 5 kg. pyrites). The gases on leaving were cooled, first in a water cooler, then in a cooling mixture of ice and salt, and finally led through a washing tower supplied with well cooled paraffin oil. The gases now leaving consisted of hydrogen, acetylene, and low-boiling sulfur derivatives of hydrocarbons. On distilling the paraffin oil and fractionating the distillate, the following portions were obtained: (1.) An oil boiling at 36–38° and containing approximately 60% sulfur and 30% carbon. (2.) Thiophen. (3.) Higher sulfur derivatives of the hydrocarbons, distilling with decomposition under the pressure of the free atmosphere. In all 500 grams distillate were obtained from 750 liters of acetylene. The yield was distributed among the three distillates as follows: (1.) Approximately 7%. (2.) Approximately 41%. (3) Approximately 40%.

Markasit, synthetical $FeS_2$, and in general those substances which liberate sulfur on heating, can be used instead of pyrites with the same results. The addition of a small quantity of sulfur to the heated solids does not appear to influence the reaction. The formation of thiophen starts at about 260°, it still takes place at 400° and over, but the best yields were obtained at 300–320°.

The low- and high-boiling sulfur derivatives of hydrocarbons so produced may be used as pharmaceutical preparations and for other purposes.

What I claim is:—

1. Process of producing sulfur derivatives of hydrocarbons consisting in conducting acetylene containing gas at a temperature of about 300° centigrade over sulfids adapted to split off sulfur on heating.

2. Process of producing sulfur derivatives of hydrocarbons consisting in conducting acetylene containing gas over pyrites at a temperature of about 300° centigrade.

3. Process of producing thiophen consisting in conducting acetylene containing gas at a temperature of about 300° centigrade over sulfids adapted to split off sulfur on heating, and isolating the thiophen from the gaseous product of reaction.

4. Process of producing thiophen consisting in conducting acetylene containing gas over pyrites at a temperature of about 300° centigrade, and isolating the thiophen from the gaseous product of reaction.

5. Process of manufacturing thiophen consisting in conducting acetylene containing gas at a temperature of about 300° centigrade over sulfids adapted to split off sulfur on heating condensing the gaseous products of reaction and isolating the formed thiophen by fractional distillation.

In testimony whereof I affix my signature in presence of two witnesses.

DR. ING. WILHELM STEINKOPF.

Witnesses:
ARNOLD E. HURMS,
FRIEDRICH SCHMIDT.